Sept. 29, 1953    S. T. BUCK    2,653,685
PORTABLE HOISTING TOWER
Filed May 22, 1950    4 Sheets-Sheet 1

INVENTOR.
STEWARD T. BUCK
BY
*J Warren Kinney, Jr.*
ATTORNEY

Sept. 29, 1953 S. T. BUCK 2,653,685
PORTABLE HOISTING TOWER
Filed May 22, 1950 4 Sheets-Sheet 4

INVENTOR.
STEWARD T. BUCK
BY
J. Warren Kinney Jr.
ATTORNEY

Patented Sept. 29, 1953

2,653,685

UNITED STATES PATENT OFFICE 2,653,685

PORTABLE HOISTING TOWER

Steward T. Buck, Cincinnati, Ohio

Application May 22, 1950, Serial No. 163,364

5 Claims. (Cl. 189—15)

1

This invention relates to hoisting towers and more particularly to a portable hoisting tower having associated therewith an elevator.

An object of the invention is to provide a portable hoisting tower which may be quickly, inexpensively, yet efficiently moved, erected, operated and retracted by one man.

Another object of the invention is to provide a portable hoisting tower in combination with a wheeled transport vehicle wherein the tower elements are so correlated with and coupled to said vehicle as to facilitate one man erection and retraction of the tower structure.

Still a further object of the invention is to provide a portable hoisting tower which is constructed and arranged whereby to provide a solid, firm, rugged tower hoist whose component parts are positively interlocked to provide a durable, reinforced structure.

Still a further object of the invention is to provide a portable hoisting tower which when in a retracted condition presents a compact, easily portable unit.

A further object of the invention is to provide a portable sectional hoisting tower having the hereinabove described characteristics, the various tower sections of which are provided with easily accessible ladder means for enabling the operator of the tower to have access to all portions of the tower.

Another object of the invention is to provide a portable hoisting tower having an elevator associated therewith, the height of which tower may be increased by the addition of extra tower sections, thereby greatly enhancing the utility of the present device.

These and other objects are attained by the means described herein and as disclosed in the accompanying drawings in which.

2

Figure 1:
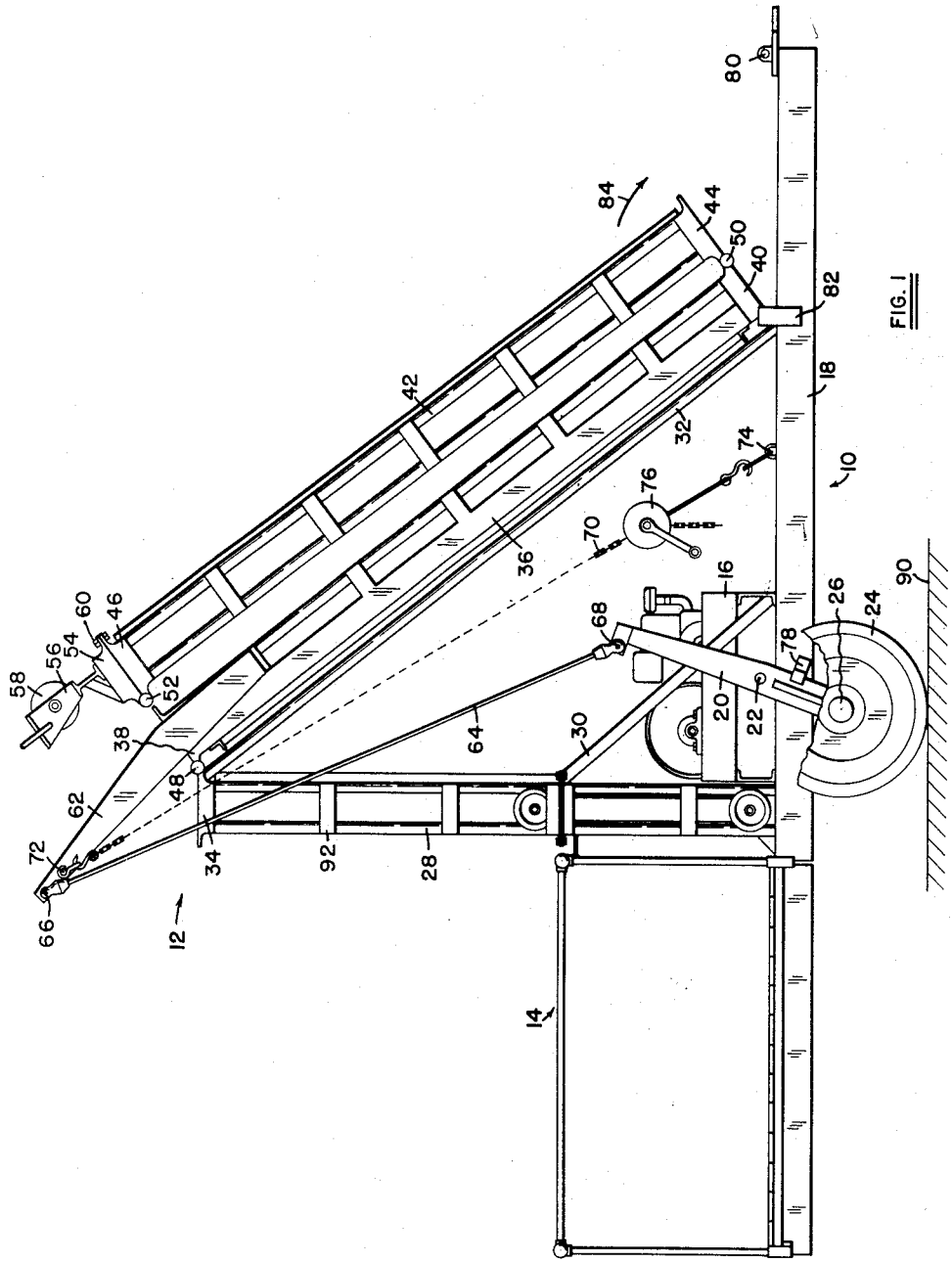
Fig. 1 is a side elevation of a portable hoisting tower embodying the teachings of the present invention, in a fully retracted, portable condition.
Figure 2:
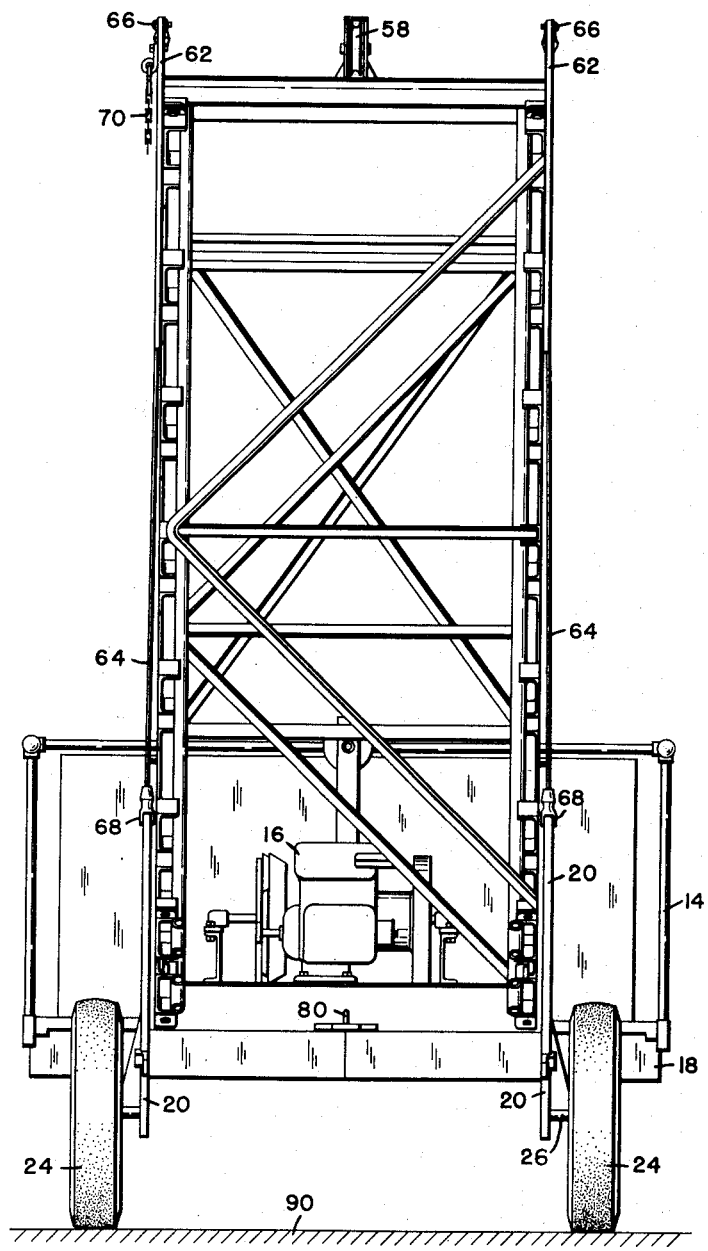
Fig. 2 is an end elevation of the device of Fig. 1.

The tower of the present invention is particularly adapted for use in construction jobs wherein supplies are elevated to different floor levels. Heretofore hoisting towers have been in widespread use, however such towers have been, for the most part, erected on the building site by a crew of steel workers. Considerable expense and time is involved in the erecting of such hoisting towers, the time and expense being substantially duplicated when the tower is dismantled. It is a known fact that the expense of such towers amounts to a sizeable item.

One of the primary objects of my device is to provide a portable hoisting tower which is so constructed and arranged as to enable one man to completely erect a tower ready for use in one-half hour. My device can likewise be retracted for transportation to another site in one-half hour by one man.

Broadly speaking, the device comprises a transport vehicle 10, a sectional tower 12, an elevator 14 and a power plant 16 for operating the elevator.

The transport vehicle includes a base 18 to which a pair of wheel levers 20 is pivotally mounted as at 22. One end of each of the wheel levers is provided with a wheel 24 rotatably journaled thereto as at 26.

Sectional tower 12 comprises a first tower section 28, the lower end of which may be secured to and in upstanding relationship with base 18 by means of bracing members 30 and 32. The upper end of section 28 is provided with a hinge plate 34.

A second tower section 36 has a hinge plate 38 secured to and carried by its lower end and a second hinge plate 40 secured to and carried by its free upper end, as illustrated.

A third tower section 42 is provided with a hinge plate 44 at its lower end and with a hinge plate 46 at its upper end. As clearly illustrated in Figs. 1, 3 and 4, hinge plate 34 of the first section is pivotally connected to hinge plate 38 of the second section by pintle 48. Likewise hinges 40 and 44 of the second and third sections are pivotally interconnected by pintle 50.

Hinge 46 is pivotally connected by pintle 52 to hinge 54 of a cat-head assembly 56, which includes a pulley 58. Relative movement between hinge plates 46 and 54 is precluded by means of a suitable fastening means such as, by way of example, a bolt and nut assembly indicated generally by the numeral 60, whereby the cat-head assembly will be rigidly secured onto the free outer end of tower section 42.

Tower levers 62 are securely fastened to the outer faces of the lower end of tower section 36 by suitable means such as, by way of example, welding. The tower levers include a forwardly extending portion which projects outwardly from and beyond the lower end of tower 36.

A connecting member such as cable 64 is provided for interconnecting the free outer end of tower lever 62, as at 66, with the free outer end of wheel lever 20, as at 68.

A second connector member such as, by way of example, a chain 70, is provided, one end being secured to the outer portion of the tower lever as at 72, the other end being anchored to base 18 as at 74. Suitable means, such as, by way of example, a hand winch 76, may be provided for enabling the operator of the device to actuate and control chain 70 for regulating relative movement of tower sections 36 and 42 with reference to tower section 28.

As clearly illustrated in Fig. 1, the numeral 78 denotes a stop member secured to base 16 which is engageable by wheel lever 20 for determining the fully raised relationship of said lever with respect to said base. It will be observed that when the wheel lever is in the fully raised position of Fig. 1 (wherein the free end of the wheel lever remote from wheel 24 is being referred to), base 18 is disposed in an elevated, wheel-borne position for enabling the retracted device to be easily transported from place to place when towed by a suitable vehicle secured to base 18 by the hitch coupling 80. It will be noted that the upper end of the second tower section 36 may be releasably secured to an anchor plate 82 when the tower is in the fully retracted position illustrated in Fig. 1, for effectively precluding relative motion between tower sections 28 and 36, and thereby positively maintaining wheel lever 20 in its fully elevated position.

Figure 3:
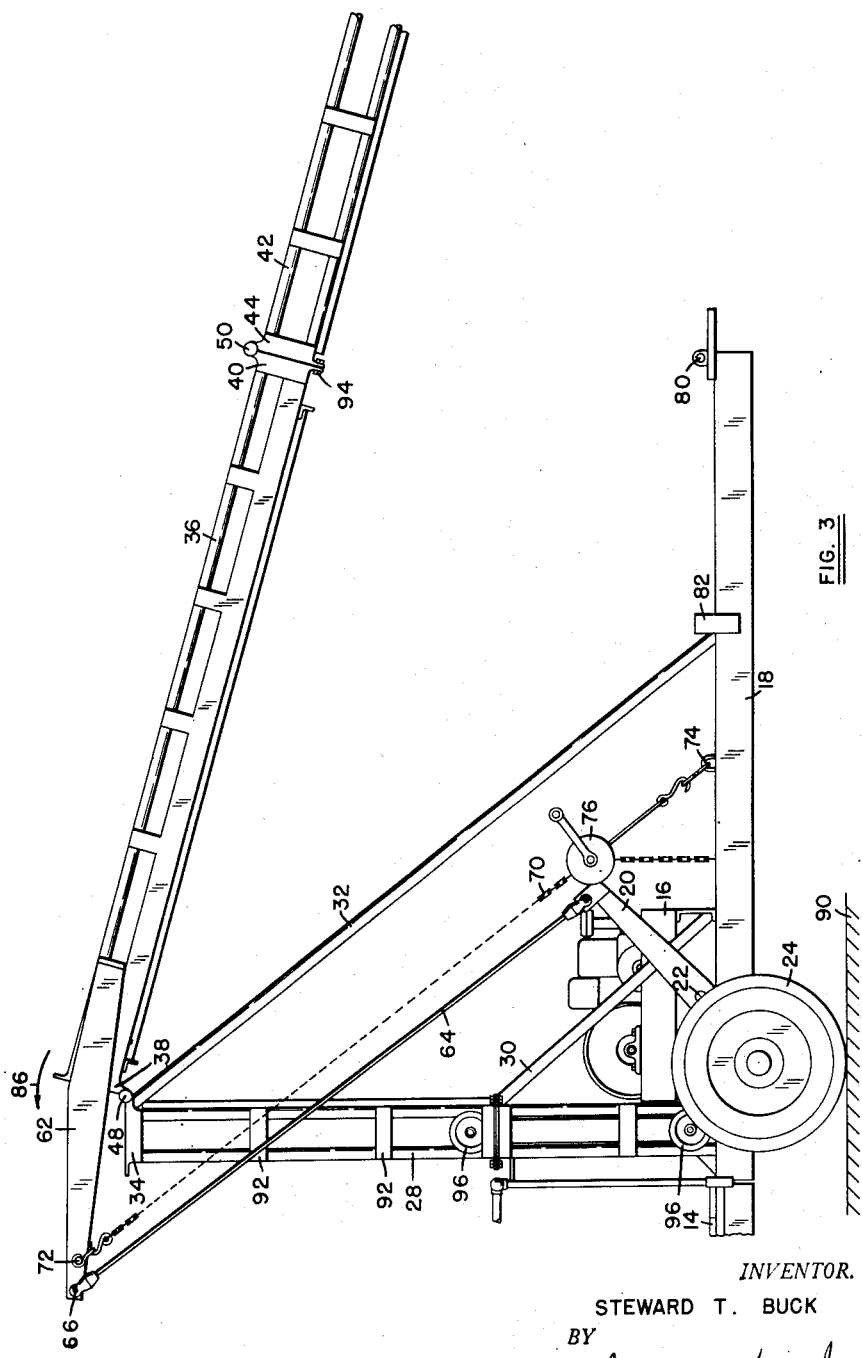
Fig. 3 is a side elevation showing the tower in one stage of an erecting or retracting operation.
Figures 4, 5, 6:
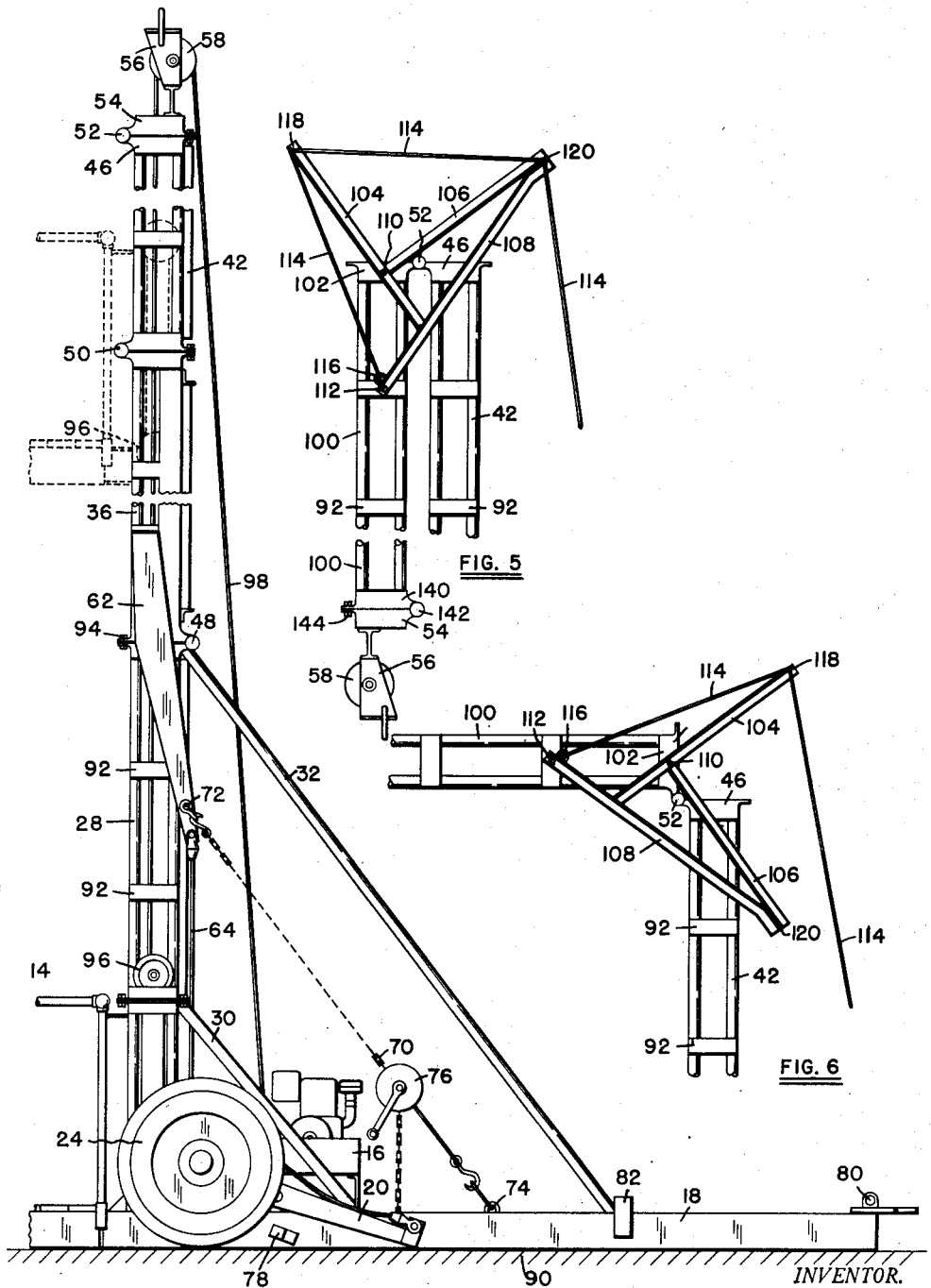
Fig. 4 is a side elevation of the portable hoisting tower of Fig. 1 in a fully erected condition.
Fig. 5 is an enlarged side elevational view of a portion of certain tower sections illustrating the manner in which the tower of Fig. 1 may be extended.
Fig. 6 is a side elevational view of the tower sections of Fig. 5 in one stage of an erecting or retracting operation.

When it is desired to elevate the sectional tower structure, the upper end of section 36 may be disconnected from anchor member 82 and section 42 folded downwardly in a clockwise direction indicated generally by the headed arrow 84, about pintle 50, for disposing the adjacent faces of hinge plates 40 and 44 in abutting relationship, and in which condition said hinge plates are securely fastened by suitable means such as a bolt and nut assembly 94, Figs. 3 and 4. It will be noted that the upper end of section 36 will be pivoted about pintle 48 incident to the unfolding of section 42 and the anchoring of said section in an end-to-end relationship with section 36.

After sections 42 and 36 have thus been secured in an end-to-end relationship, section 36, and its associated section 42 may be pivoted about pintle 48 and swung upwardly thereabout in a counter-clockwise direction indicated by the headed arrow 86, of Fig. 3 incident to actuation of winch 76. It will be observed that the entire weight of base 18, including the weight of all items supported thereon, including the various tower sections, will be utilized to assist and augment the erecting force applied via the winch to the tower lever 62 for swinging sections 36 and 42 upwardly about pintle 48 incident to a clockwise lowering of wheel lever 20 about pivotal connection 22.

As wheel lever 20 is thus moved in a clockwise direction, base 18 is lowered incident to raising and retraction of wheel 24.

From the foregoing it will be noted that I have provided simple yet highly effective means for erecting tower sections 36 and 42, it being noted that base 18 will come to rest upon supporting surface 90 when the wheel lever 20 has been shifted to its fully lowered position, disclosed in Fig. 4, wherein wheel 24 has been fully retracted.

In the preferred embodiment of the invention, I prefer to utilize the action of wheel lever 20 for assistance in swinging tower section 36 upwardly with respect to tower 28 by an amount short of vertical, say approximately 30 degrees. I then utilize hand winch 76 alone for completing the erection of sections 36 and 42 whereby the lower end of section 36 will be disposed in end-to-end relationship with upper end of section 28 as illustrated in Fig. 4. The operator may then climb the steps 92 of the first section for locking hinge plates 34 and 38 together such as by means of a nut and bolt assembly 94, or the operator may prefer to ride up on elevator 14, providing someone is available for manipulating power plant 16.

It will therefore be noted that in all those instances in which the weight of the base 18, including the various items supported thereon, provides some assistance in raising the tower, an additional force applied, such as, by way of example, to the tower remote from the first section 28, will be required in order to lower the tower to the retracted condition illustrated in Fig. 1.

It should be understood that the present invention is neither directed to nor concerned with the particular type or arrangement of elevator construction, it being understood that any suitable set-up may be utilized wherein the tower sections contain suitable track members upon which guide portions of the elevator, such as wheels 96, may ride.

At this point it should be clearly understood that the elevator cable 98 is at all times threaded through the various tower sections, and will extend over pulley 58 of the cat-head, even when the tower is in a fully retracted condition. The elevator cable 98 has not been illustrated in Figs. 1 and 3 since to do so would merely unnecessarily encumber the drawings.

When it is desired to add a tower section 100, it may be placed on elevator 14 and elevated to the top of the uppermost tower section, denoted in Fig. 4 by the numeral 42. Of course, a gin pole is carried by the elevator platform. The elevator platform may then be locked in its fully elevated position by placing interfering elements beneath the elevator platform in such a manner as to secure the elevator to the tower structure independently of elevator cable 98. The hinge plate 54 of the cat-head assembly 55 may then be removed, and hinge plate 102 of the fourth tower section 100 pivotally secured to hinge plate 46 by the same pintle 52 which originally hingedly interconnected hinge plates 54 and 46.

Hinge plate 54 of the cat-head assembly may then be secured to hinge plate 140 secured to and carried by the upper end of tower section 100, by pintle 142 and suitable fastening means such as a nut and bolt assembly 144. It will be observed that the cable drum of the hoisting mechanism will be backed off to provide slack in cable 98 for enabling the cat-head assembly to thus be mounted onto the outer end of tower section 100.

Tower section 100 may then be lifted upwardly by a block and tackle assembly, or other suitable means secured to the free upper end of the gin pole for disposing it in end-to-end relationship with tower section 42, cat-head 56 uppermost. When this has been accomplished, hinge plates 46 and 102 may be securely fastened by means of pintle 52 and a suitable nut and bolt assembly whereby tower section 100 will become an integral part of the hoisting tower. The elevator may then be unblocked, thereby enabling it to be operated throughout the entire height of the composite tower.

From the foregoing it will be observed that I have provided a portable hoisting tower which may be quickly erected by a single operator in a short time. The tower may be dismantled by one operator wherein the erection procedure is reversed. It should be understood, of course, that in those instances in which the weight of base 18 and the various items supported thereon is sufficient to swing the tower section upwardly without the use of the winch, as often occurs particularly when less than a full tower is being erected, then and in that event an additional force will be required to lower the tower beyond the position at which its further lowering is opposed by the weight of the base. Such additional force may be simply applied by means of a line suspended from a portion of the tower section remote from pintle 48.

When in fuly erected position, one or more sets of guy wires may be utilized for enhancing the rigidity of the device, however, very satisfactory results have been obtained using the device as illustrated in Fig. 4.

With reference now to Figs. 5 and 6, I have illustrated the preferred manner in which one or more additional tower sections 100 may be added onto the free outer end of section 42. The numeral 100 denotes an extra tower section or sections, it being further observed that the lower end of the section is provided with a hinge plate 102 and with a lazy A frame including elements 104, 106 and 108. Elements 104 and 106 are secured to pulley plate 102 as at 110, whereas element 108 is secured to tower section 100 as at 112. A cable 114 is secured to element 108 as at 116, said cable being disposed in suitable U-shaped guide members provided one on the outer ends of each of elements 104, 106 and 108 as at 118 to 120, respectively.

Hinge plate 102 may be pivotally secured to hinge plate 46 by means of pintle 52 wherein tower section 100 will lie on top of section 42 when in the position of Fig. 3. After the second and third tower sections 36 and 42 have been fully elevated, the fourth tower section, 100, which will be in the lowered condition, suspended from section 42, as illustrated in Fig. 5, may then be swung upwardly to a fully elevated position incident to the application of a pulling force on erecting cable 114.

The elevator may then be raised and the lazy A frame of section 100 removed and placed on the elevator for storage until such time as the tower is to be retracted. Retraction may be accomplished by reversing the erection process.

It should likewise be noted that in certain instances it may be desirable to combine tower sections 28 and 42 whereby to provide a single section of a length approximating the combined lengths of these sections, as illustrated. Tower section 100 may, of course, be pivotally secured to the free outer end of this section, whereby the composite tower may be considered as comprising a first section 28, a second section 36—42 and a third section 100.

It should be understood that various changes and modifications may be made in the structural details of the device within the scope of the appended claims, without departing from the spirit of the invention.

What is claimed is:

1. In combination: A transport vehicle including a base, wheel levers pivotally mounted on said base, wheels rotatably journaled to one end of each of said levers, said levers movable between raised and lowered positions for disposing said base in an elevated, wheel-borne position or in a lowered, immobile position with the wheels fully retracted, a sectional tower including a first section which is secured to and in upstanding relationship with said base, and a second section pivotally secured to said first section, a tower lever secured to and projecting from the lower end of said second section, means interconnecting that end of the wheel lever remote from its associated wheel with the free outer end of said tower lever whereby the weight of said base, including the weight of the tower supported thereon, is utilized to swing said second section upwardly about its connection with the first section incident to movement of said base from an elevated wheel-borne position to a lowered immobile position, and means operable for anchoring the second tower section in a fully lowered position relative to the base for precluding accidental or unintentional relative movement between the wheel levers and base when the said base is in a fully elevated wheel-borne position.

2. In combination: A transport vehicle including a base, wheel levers pivotally mounted on said base, wheels rotatably journaled to one end of each of said levers, said levers movable between raised and lowered positions for disposing said base in an elevated, wheel-borne position or in a lowered, immobile position with the wheels fully retracted, a sectional tower including a first section which is secured to and in upstanding relationship with said base, and a second section pivotally secured to said first section, a tower lever secured to and projecting from the lower end of said second section, means interconnecting that end of the wheel lever remote from its associated wheel with the free outer end of said tower lever whereby the weight of said base, including the weight of the tower supported thereon, is utilized to assist in swinging said second section upwardly about its connection with the first section incident to movement of said base from an elevated wheel-borne position to a lowered immobile position, and means interposed between said tower lever and said base operable for augmenting and controlling the movement of said second tower section about its pivotal connection with said first section, and means operable for anchoring the second tower section in a fully lowered position relative to the base for precluding accidental or unintentional relative movement between the wheel levers and base when the said base is in a fully elevated wheel-borne position.

3. In combination: A transport vehicle including a base, wheel levers pivotally mounted on said base, wheels rotatably journaled to one end of each of said levers, said levers movable between raised and lowered positions for disposing said base in an elevated, wheel-borne position or in a lowered immobile position with the wheels fully retracted, a sectional tower including a first section secured to and in upstanding relationship with said base, and a second section pivotally secured at its lower end to the upper end of said first section, a tower lever secured to said second section projecting forwardly from the lower end thereof, means interconnecting said wheel lever to said tower lever for utilizing the weight of said base, including the weight of the tower thereon, to assist in swinging said second tower section upwardly about its pivotal connection with said first section incident to lowering of said base from a wheel-borne position to a lowered immobile position, and means for securely though releasably locking said second section in end-to-end upright operating position with respect to said first section, and means operable for anchoring the second tower section in a fully lowered position relative to the base for precluding accidental or unintentional relative movement between the wheel levers and base when the said base is in a fully elevated wheel-borne position.

4. In combination: A transport vehicle including a base, wheel levers pivotally mounted on said base, wheels rotatably journaled to one end of each of said levers, said levers movable between raised and lowered positions for disposing said base in an elevated, wheel-borne position or in a lowered immobile position with the wheels fully retracted, a sectional tower including a first section secured to and in upstanding relationship with said base, a second section pivotally secured at one end to the upper end of said first section, and a third section pivotally secured to the other end of the second section, means for locking said second and third sections in end-to-end relationship, a tower lever secured to and projecting from the lower end of said second section, means interconnecting said wheel lever to said tower lever whereby the weight of said base, including the weight of all items supported thereon, is utilized to assist in swinging the second and third sections of said tower upwardly about the pivotal connection of said first and second sections incident to lowering of said base from a wheel-borne position to a lowered immobile position, and means operable for anchoring the second tower section in a fully lowered position relative to the base for precluding accidental or unintentional relative movement between the wheel levers and base when the said base is in a fully elevated wheel-borne position.

5. In combination: A transport vehicle including a base, wheel levers pivotally mounted on said base, wheels rotatably journaled to one end of each of said levers, said levers movable between raised and lowered positions for disposing said base in an elevated, wheel-borne position or in a lowered immobile position with the wheels fully retracted, a sectional tower including a first section which is secured to and in upstanding relationship with said base, a second tower section pivotally secured to that end of said first section remote from said base, tower levers secured to opposite sides of and projecting from the lower end of said second section, means interconnecting said wheel levers to corresponding tower levers, whereby the weight of said base, including the weight of all items supported thereon, is utilized to assist in swinging the second tower section upwardly about its pivotal connection with said first section incident to movement of said wheel lever from raised to lowered position while lowering said base from a wheel-borne position to a lowered immobile position, means for locking said second section in end-to-end upright operating relationship with said first section, elevator guide means in said tower sections, an elevator operable vertically in said tower along said guide means, elevator actuating means secured to and carried by said base, means operatively interconnecting said elevator with said elevator actuating means, means interposed between said tower lever and base operable for controlling movement of said second tower section about its pivotal connection with said first section incident to raising and lowering of said second section, and means operable for anchoring the second tower section in a fully lowered position relative to the base for precluding accidental or unintentional relative movement between the wheel levers and base when the said base is in a fully elevated wheel-borne position.

STEWARD T. BUCK.

References Cited in the file of this patent

UNITED STATES PATENTS

| Number | Name | Date |
| --- | --- | --- |
| 2,241,275 | Shinn et al. | May 6, 1941 |
| 2,300,763 | Athy | Nov. 3, 1942 |
| 2,335,584 | Couse | Nov. 30, 1943 |
| 2,364,851 | Johansen | Dec. 12, 1944 |
| 2,379,333 | Athy | June 26, 1945 |
| 2,442,071 | Bunten | May 25, 1948 |
| 2,478,795 | Whalen et al. | Aug. 9, 1949 |